(12) United States Patent
Maliverney et al.

(10) Patent No.: US 10,829,597 B2
(45) Date of Patent: Nov. 10, 2020

(54) METHOD FOR THE PREPARATION OF ORGANOPOLYSILOXANES HAVING (METH)ACRYLATE FUNCTIONS

(71) Applicant: ELKEM SILICONES FRANCE SAS, Lyons (FR)

(72) Inventors: Christian Maliverney, Saint Julien sur Bibost (FR); Hassene Bachir, Vaulx en Velin (FR)

(73) Assignee: ELKEM SILICONES FRANCE SAS, Lyons (FR)

( * ) Notice: Subject to any disclaimer, the term of this patent is extended or adjusted under 35 U.S.C. 154(b) by 85 days.

(21) Appl. No.: 16/096,892

(22) PCT Filed: May 2, 2017

(86) PCT No.: PCT/FR2017/000079
§ 371 (c)(1),
(2) Date: Oct. 26, 2018

(87) PCT Pub. No.: WO2017/187030
PCT Pub. Date: Nov. 2, 2017

(65) Prior Publication Data
US 2019/0135983 A1    May 9, 2019

(30) Foreign Application Priority Data

Apr. 29, 2016 (FR) .................................... 16 00717

(51) Int. Cl.
| | | |
|---|---|---|
| *C08G 77/08* | (2006.01) |
| *C08G 77/14* | (2006.01) |
| *C08G 77/38* | (2006.01) |
| *C09D 183/06* | (2006.01) |
| *C08F 299/08* | (2006.01) |
| *C08L 83/06* | (2006.01) |
| *C08G 77/20* | (2006.01) |
| *B01J 31/22* | (2006.01) |

(52) U.S. Cl.
CPC ............ *C08G 77/38* (2013.01); *C08F 299/08* (2013.01); *C08G 77/08* (2013.01); *C08G 77/14* (2013.01); *C08L 83/06* (2013.01); *C09D 183/06* (2013.01); *B01J 31/22* (2013.01); *B01J 2531/0208* (2013.01); *B01J 2531/62* (2013.01); *C08G 77/20* (2013.01); *C08L 2312/06* (2013.01)

(58) Field of Classification Search
CPC ......... C08G 77/38; C08G 77/08; C08G 77/14
See application file for complete search history.

(56) References Cited

U.S. PATENT DOCUMENTS 4,978,726 A * 12/1990 Dohler .................. C08G 77/38
                                                                525/479
6,548,568 B1 * 4/2003 Pinto .................... C08F 283/12
                                                                522/99

FOREIGN PATENT DOCUMENTS

FR           2632960 A1    12/1989
WO        01/77240 A2    10/2001

OTHER PUBLICATIONS

International Search Report of International Patent Application No. PCT/FR2017/000079 dated Jun. 19, 2017.

* cited by examiner

*Primary Examiner* — Margaret G Moore
(74) *Attorney, Agent, or Firm* — McBee Moore & Vanik IP, LLC

(57) ABSTRACT

The invention relates to a method for preparing polyorganosiloxanes functionalized by (meth)acrylate groups, preferably acrylate groups.

16 Claims, No Drawings

METHOD FOR THE PREPARATION OF ORGANOPOLYSILOXANES HAVING (METH)ACRYLATE FUNCTIONS

CROSS-REFERENCE TO RELATED APPLICATIONS

This application is a National Stage entry of International Application No. PCT/FR2017/000079, filed 02 May 2017, which claims priority to French Patent Application No. 16/00717, filed 29 Apr. 2016.

BACKGROUND

Field

The present invention relates to a process for preparing organopolysiloxanes functionalized with (meth)acrylate groups, preferably acrylate groups. For the whole of the document, it should be understood that (meth)acrylate groups comprise acrylate groups, methacrylate groups or a mixture of both.

Description of Related Art

These (meth)acrylate functionalities are present in hydrocarbon-based radicals bonded to the polysiloxane chain by an Si—C bond which may be present in the chain or at the chain end. These (meth)acrylic acid ester functions are capable of reacting, via the radical route, under actinic and/or heat activation according to a polyaddition polymerization mechanism.

These (meth)acrylate-function-comprising organopolysiloxanes are widely used in radically crosslinkable silicone compositions for producing an elastomer, which can optionally be thin-film-coated onto a flexible support which is made of textile, paper, polyvinyl chloride (PVC), polyester, polypropylene, polyamide, polyethylene, polyethylene terephthalate (PET), polyurethane or nonwoven glass fibers.

The coating of silicone formulations onto flexible supports is intended for numerous applications. For example, when the flexible support is a textile, waterproofing properties are intended, or when the support is a paper or a polymer of PVC or PET type, non-stick properties are usually sought.

Non-stick coatings are useful for numerous applications where it is required to render a surface or a material non-stick with respect to other materials, to which said surface or material would normally stick. For example, silicone compositions are used as coatings for non-stick papers and can thus be combined with adhesive elements that can be easily released without losing their adhesive properties, these elements possibly being pressure-sensitive adhesives for labels, decorative laminates, transfer tape, etc. Silicone-based non-stick coatings applied on paper, polyethylene, polypropylene, polyester and other supports of this type are also used as non-stick surfaces for products for food use and in particular in the industrial packaging sector.

There has consequently for a long time been a great deal of interest in these (meth)acrylate-function-comprising organopolysiloxanes and the preparation thereof can be envisioned in various ways described in the prior art.

It is known that (meth)acrylate-function-comprising organopolysiloxanes are obtained industrially by reaction between an organopolysiloxane functionalized with epoxy groups and (meth)acrylic acid in the presence of a chromium-based catalyst. The (meth)acrylic acid reacts with the epoxy group to form a (meth)acrylic acid monoester comprising a hydroxyl group in the vicinal position. This reaction is described in comparative example 2 of patent FR 2632960 wherein an organopolysiloxane with epoxy functions reacts with acrylic acid in the presence of chromium (III) 2-ethylhexanoate as catalyst, to obtain an organopolysiloxane with acrylate functions. No solvent is used for carrying out this reaction and a reaction time of 30 hours at 100° C. is described. When the teaching of this reference was reproduced, it was noted that the reaction medium was heterogeneous, no doubt because of the lack of solubility of the catalyst in the organopolysiloxanes. As long as the reaction medium is not stirred, a deposit forms, which is a major drawback for its industrial use since deposits in equipment can lead to blockages and complex systems for rinsing and cleaning reactors and pipes need to be implemented in order to manage this risk. Patent EP 1276825-B1 also teaches the preparation of acrylate-function-comprising organopolysiloxanes by reaction between an organopolysiloxane having epoxy functionalities and acrylic acid in the presence of chromium(III) acetate and of two solvents, one of which being an alcohol. Nevertheless, the yield and the selectivity of this process can be improved. Furthermore, the compositions comprising the acrylic-function-comprising organopolysiloxanes obtained according to the teaching of patent EP 1276825 have an unpleasant odor that is uncomfortable for users of these compositions.

SUMMARY

In this context, one of the essential objectives of the present invention is to develop a process for preparing organopolysiloxanes functionalized with (meth)acrylate groups with an improved yield and an optimized reaction time, for example less than 10 hours, and not having any unpleasant odor.

Another essential objective of the present invention is to provide a process for preparing organopolysiloxanes functionalized with (meth)acrylate groups, which is easy to implement during industrial production, minimizing the risks of blocking up the equipment.

Another essential objective of the present invention is to provide a process for preparing organopolysiloxanes functionalized with (meth)acrylate groups, the industrial implementation of which is controlled by decreasing the concentration of catalyst.

Another essential objective of this invention is to provide a process for preparing organopolysiloxanes functionalized with (meth)acrylate groups, wherein the organopolysiloxane chain length is not modified, that is to say wherein there are no siloxane bond cleavage and redistribution reactions (chain shortening) nor any bridging (chain extending) reactions, for example by the side reaction between an epoxide and the hydroxyl function of the hydroxy acrylate or by the epoxide polymerization.

Another objective of this invention is to provide a process for producing a silicone coating on a substrate with good properties of attachment or adhesion to the substrate.

All these objectives, among others, are achieved by the present invention which relates to a process for preparing a composition X comprising at least one organopolysiloxane A comprising at least one (meth)acrylate group, said process comprising the following steps:

a) at least one organopolysiloxane B comprising at least one epoxy group is reacted, at a temperature of between 50 and 130° C., preferably between 70 and 130° C. and even more preferentially between 90 and 125° C., with acrylic acid or methacrylic acid or a mixture of the two, in the absence of alcohol and in the presence:
of a catalyst C which is a complex of chromium in the oxidation state (III),
of at least 4.5% by weight, relative to the total weight of the reaction medium of this step a), of a solvent S and
of at least one inhibitor of polymerization of acrylic acid or of methacrylic acid,
b) the reaction medium obtained at the end of step a) is devolatilized and
c) said composition X comprising at least one organopolysiloxane A is obtained.

Step a) of the process for preparing the composition X according to the invention is carried out in the absence of alcohol and in particular in the absence of butanol.

The term "solvent" is intended to mean a non-reactive solvent. Consequently, the solvent S is different than the organopolysiloxane B, than acrylic acid and than methacrylic acid.

According to another embodiment, the process for preparing the composition in X according to the invention is carried out in the absence of double-bond-free carboxylic acid. As double-bond-free carboxylic acid, mention may be made of alkyl carboxylic acids having from 2 to 11 carbon atoms. Examples of such monocarboxylic acids are acetic acid, propionic acid, butyric acid, valeric acid, pivalic acid, 2,2-dimethylbutyric acid, 2,2-dimethylvaleric acid, acetoacetic acid, isooctanecarboxylic acid, isododecanecarboxylic acid, scorbic acid and undecanoic acid, and in particular acetic acid. Preferably, the process for preparing the composition X according to the invention is carried out in the absence of acetic acid.

The process for preparing the composition X according to the invention has the advantage of obtaining an improved organopolysiloxane A yield. The inventors, to their credit, have identified that the implementation of the process in the absence of alcoholic solvent makes it possible to obtain a better organopolysiloxane A yield. Furthermore, this process has the advantage of having, in step a), a homogeneous and clear reaction medium simplifying the industrial implementation of said process, limiting the risk of blocking of the equipment and, consequently, improving health and safety conditions. Moreover, the process according to the invention does not modify the chain length of the starting organopolysiloxane B, while at the same time having a yield and a duration compatible with an industrial production. Another advantage of the process according to the invention is that the composition X obtained does not have an unpleasant odor.

Another advantage of the process according to the invention is that, in step a) of the process, a degree of conversion of the epoxy groups of greater than 98% can be obtained in less than six hours. Those skilled in the art will know how to adjust the reaction time of step a) of the process according to the invention as a function of the temperature in order to obtain a sufficient degree of conversion.

According to one preferential embodiment of the invention, the duration of step a) is between one and five hours when the temperature of step a) is between 90 and 125° C.

The organopolysiloxane A obtained by means of the process of the invention comprises siloxyl units (I.2), (I.3), and optionally (I.1), of formulae below:

$$Y_a Z_b^1 SiO_{\frac{4-(a+b)}{2}} \quad (I.1)$$

 (I.2)

 (I.3)

wherein:
a=1 or 2, b=0, 1 or 2 and a+b=1, 2 or 3,
c=0, 1, 2 or 3,
d=1 or 2, e=0, 1 or 2 and d+e=1, 2 or 3,
the symbols Y, which may be identical or different, represent a hydrocarbon-based group comprising an epoxy group and optionally also comprising one or more heteroatoms, such as an oxygen atom, said hydrocarbon-based group Y preferably having from 2 to 20 carbon atoms inclusive, and, even more preferentially, Y is chosen from the group consisting of an alkyl glycidyl ether, a linear, branched or cyclic epoxyalkyl, a linear, branched or cyclic epoxyalkenyl and a carboxylic acid glycidyl ester;
the symbols $Z^1$ and $Z^2$, which may be identical or different, represent a monovalent hydrocarbon-based group having from 1 to 30 carbon atoms and preferably chosen from the group consisting of alkyl groups having from 1 to 8 carbon atoms and aryl groups having from 6 to 12 carbon atoms, and even more preferentially chosen from the group consisting of a methyl, ethyl, propyl, 3,3,3-trifluoropropyl, xylyl, toluyl and phenyl group;
the symbols V, which may be identical or different, represent a hydrocarbon-based group comprising a (meth)acrylate group, said hydrocarbon-based group V preferably having from 5 to 23 carbon atoms inclusive, and
said organopolysiloxane A comprises, per molecule, at least two silicon atoms and at least one siloxyl unit (I.3).

The organopolysiloxane B comprises siloxyl units (I.1) and (I.2) of formulae below:

 (I.1)

and

 (I.2)

wherein:
a=1 or 2, b=0, 1 or 2 and a+b=1, 2 or 3,
c=0, 1, 2 or 3,
the symbols Y, which may be identical or different, represent a hydrocarbon-based group comprising an epoxy group and optionally also comprising one or more heteroatoms, such as an oxygen atom, said hydrocarbon-based group Y preferably having from 2 to 20 carbon atoms inclusive, and, even more preferentially, Y is chosen from the group consisting of an alkyl glycidyl ether, a linear, branched or cyclic epoxyalkyl, a linear, branched or cyclic epoxyalkenyl and a carboxylic acid glycidyl ester;
the symbols $Z^1$ and $Z^2$, which may be identical or different, represent a monovalent hydrocarbon-based group having from 1 to 30 carbon atoms and preferably chosen from the group consisting of alkyl groups having from 1 to 8 carbon atoms and aryl groups having from 6 to 12 carbon atoms, and even more preferentially chosen from the group consisting of a methyl, ethyl, propyl, 3,3,3-trifluoropropyl, xylyl, toluyl and phenyl group; and said organopolysiloxane B comprises, per molecule, at least two silicon atoms and at least one siloxyl unit (I.1).

DETAILED DESCRIPTION OF A PREFERRED EMBODIMENT

Preferably, for the siloxyl unit (I.1), the symbol Y is chosen from the group consisting of the hydrocarbon-based groups (R-1) to (R-6) of formulae below:

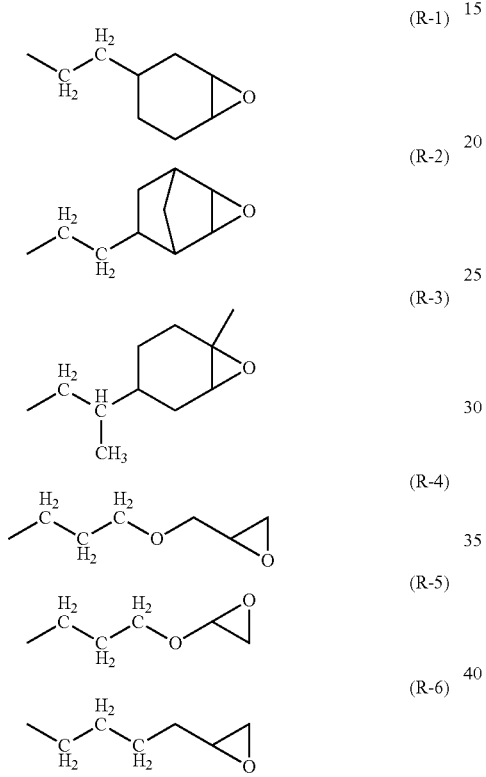

According to one particularly preferred embodiment, in the siloxyl unit (I.1), the symbol Y is the hydrocarbon-based group (R-4) of formula below:

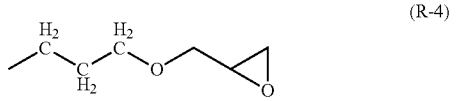

These organopolysiloxanes B can have a linear, branched or cyclic structure and their degree of polymerization is between 2 and 5000, preferably between 2 and 1000 and even more preferentially between 2 and 500.

Preferably, the organopolysiloxane B has a linear structure and comprises siloxyl units (I.1) and (I.2) of formulae below:

$$Y_a Z^1_b SiO_{\frac{4-(a+b)}{2}} \quad (I.1)$$

$$Z^2_c SiO_{\frac{4-c}{2}} \quad (I.2)$$

wherein:
a=1 or 2, b=0, 1 or 2 and a+b=2 or 3,
c=2 or 3,
the symbols Y, which may be identical or different, represent a hydrocarbon-based group comprising an epoxy group and optionally also comprising one or more heteroatoms, such as an oxygen atom, said hydrocarbon-based group Y preferably having from 2 to 20 carbon atoms inclusive, and even more preferentially, Y is chosen from the group consisting of an alkyl glycidyl ether, a linear, branched or cyclic epoxyalkyl, a linear, branched or cyclic epoxyalkenyl and a carboxylic acid glycidyl ester;
the symbols $Z^1$ and $Z^2$, which may be identical or different, represent a monovalent hydrocarbon-based group having from 1 to 30 carbon atoms and preferably chosen from the group consisting of alkyl groups having from 1 to 8 carbon atoms and aryl groups having from 6 to 12 carbon atoms, and even more preferentially chosen from the group consisting of a methyl, ethyl, propyl, 3,3,3-trifluoropropyl, xylyl, toluyl and phenyl group; and
said organopolysiloxane B comprising, per molecule, at least two silicon atoms and at least one siloxyl unit (I.1).

When it is a linear polymer, the organopolysiloxane B essentially consists of siloxyl units "D" chosen from the group consisting of the siloxyl units $Y_2SiO_{2/2}$, $YZ^1SiO_{2/2}$ and $Z^2_2SiO_{2/2}$, and of siloxyl units "M" chosen from the group consisting of the siloxyl units $Y_3SiO_{1/2}$, $YZ^1_2SiO_{1/2}$, $Y_2Z^1SiO_{1/2}$ and $Z^2_3SiO_{1/2}$. The symbols Y, $Z^1$ and $Z^2$ are as described above.

According to one preferred embodiment of the invention, the organopolysiloxane B essentially consists of siloxyl units "D" chosen from the group consisting of the siloxyl units $YZ^1SiO_{2/2}$ and $Z^2_2SiO_{2/2}$, and of siloxyl units "M" chosen from the group consisting of the siloxyl units $YZ^1_2SiO_{1/2}$ and $Z^2_3SiO_{1/2}$. The symbols Y, $Z^1$ and $Z^2$ are as described above.

The organopolysiloxane B has a dynamic viscosity at 25° C. of between 1 and 100 000 mPa·s, preferably between 10 and 50 000 mPa·s, and even more preferentially between 10 and 10 000 mPa·s.

All the viscosities referred to in the present disclosure correspond to a magnitude of dynamic viscosity at 25° C. termed "Newtonian", that is to say the dynamic viscosity which is measured, in a manner known per se, with a Brookfield viscometer at a shear rate gradient sufficiently low for the viscosity measured to be independent of the rate gradient.

According to one preferential embodiment of the invention, the organopolysiloxane B contains, per molecule, from 1 to 100 siloxyl units (I.1) bearing at least one hydrocarbon-based group comprising an epoxy group. According to one more preferential embodiment, the organopolysiloxane B contains, per molecule, from 2 to 50 siloxyl units (I.1) and more preferentially the organopolysiloxane B contains, per molecule again, from 2 to 15 siloxyl units (I.1).

According to another embodiment, the organopolysiloxane B contain from 1% to 60% by weight of hydrocarbon-based groups Y comprising an epoxy group, preferably from 1% to 30% by weight and even more preferentially from 1% to 15% by weight.

According to one preferential embodiment of the process according to the invention, the organopolysiloxane B is chosen from the compounds of formulae (B-1) to (B-4) below:

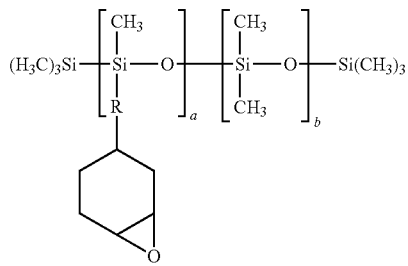

(B-1) wherein R is an alkyl group comprising from 2 to 5 carbon atoms, a is between 2 and 50 and preferentially between 2 and 15, and b is between 20 and 400;

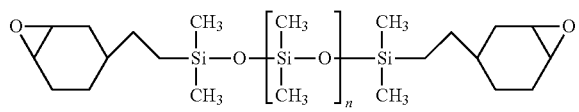

(B-2) wherein n is between 0 and 250;

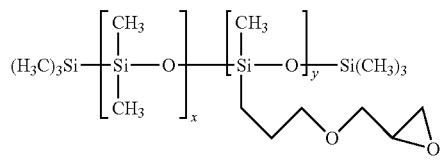

(B-3) wherein x is between 10 and 300 and y is between 2 and 30, preferably between 2 and 15; and

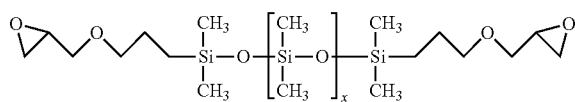

(B-4) wherein x is between 0 and 250.

According to the applications envisioned for the organopolysiloxane A, a degree of conversion of the epoxy functions of the organopolysiloxane B, which is total or partial, may be desired. It is thus possible to obtain an organopolysiloxane A comprising epoxy functions and (meth)acrylate functions which can be used for example as an adhesion modulator or as an adhesion promoter, or an organopolysiloxane A comprising only or essentially (meth)acrylate functions, which is used for example as an essential constituent of radically crosslinkable silicone compositions for producing an elastomer. The molar ratio R between the (meth)acrylic acid and the epoxy functions of the organopolysiloxane B used in the process will be adjusted accordingly.

According to one embodiment of the process according to the invention, in step a), the molar ratio R between the (meth)acrylic acid and the epoxy group(s) borne by the organopolysiloxane B is greater than 1 and preferably between 1.05 and 1.50, and even more preferentially between 1.05 and 1.20.

For the whole of the document, the (meth)acrylic acid comprises acrylic acid and methacrylic acid.

According to one preferred embodiment of the process according to the invention, in step a), the molar ratio R between the acrylic acid and the epoxy group(s) borne by the organopolysiloxane B is greater than 1 and preferably between 1.05 and 1.50, and even more preferentially between 1.05 and 1.20.

The catalyst C is a complex of chromium in the oxidation state (III).

Preferably, the catalyst C is a chromium complex of formula (1) below:

$$[Cr(L^1)_3] \quad (1)$$

wherein the symbols $L^1$, which may be identical or different, represent a carboxylate anion.

According to one embodiment of the invention, the catalyst C is a chromium(III) carboxylate of formula (1) below:

$$[Cr(L^1)_3] \quad (1)$$

wherein the symbols $L^1$ are ligands, which may be identical or different, chosen from the group of carboxylate anions, having from 1 to 40 carbon atoms.

The carboxylate ligands $L^1$ of use according to the invention are for example:

anions derived from aliphatic carboxylic acids, such as the anions: methanoate or formate $[H-COO]^-$, ethanoate or acetate $[CH_3-COO]^-$, propanoate or propionate $[CH_3CH_2-COO]^-$, butanoate or butyrate $[CH_3-(CH_2)_2-COO]^-$, pentanoate or valerate $[CH_3-(CH_2)_3-COO]^-$, hexanoate or caproate $[CH_3-(CH_2)_4-COO]^-$, heptanoate $[CH_3-(CH_2)_5-COO]^-$, octanoate $[CH_3-(CH_2)_6-COO]^-$, 2-ethyl hexanoate $[CH_3-(CH_2)_4-CH(C_2H_5)-COO]^-$, nonanoate $[CH_3-(CH_2)_7-COO]^-$, decanoate $[CH_3-(CH_2)_8-COO]^-$, undecanoate $[CH_3-(CH_2)_9-COO]^-$, dodecanoate or laurate $[CH_3-(CH_2)_{10}-COO]^-$, tridecanoate $[CH_3-(CH_2)_{11}-COO]^-$, tetradecanoate or myristate $[CH_3-(CH_2)_{12}-COO]^-$, pentadecanoate $[CH_3-(CH_2)_{13}-COO]^-$, hexadecanoate or palmitate $[CH_3-(CH_2)_{14}-COO]^-$, heptadecanoate $[CH_3-(CH_2)_{15}-COO]^-$, octadecanoate or stearate $[CH_3-(CH_2)_{16}-COO]^-$, nonadecanoate $[CH_3-(CH_2)_{17}-COO]^-$, eicosanoate $[CH_3-(CH_2)_{18}-COO]^-$, heneicosanoate $[CH_3-(CH_2)_{19}-COO]^-$, docosanoate or behenate $[CH_3-(CH_2)_{20}-COO]^-$, tricosanoate $[CH_3-(CH_2)_{21}-COO]^-$, tetracosanoate or lignocerate $[CH_3-(CH_2)_{22}-COO]^-$, pentacosanoate $[CH_3-(CH_2)_{23}-COO]^-$, hexacosanoate $[CH_3-(CH_2)_{24}-COO]^-$, heptacosanoate acid $[CH_3-(CH_2)_{25}-COO]^-$, octacosanoate $[CH_3-(CH_2)_{26}-COO]^-$, nonacosanoate $[CH_3-(CH_2)_{27}-COO]^-$, triacontanoate $[CH_3-(CH_2)_{28}-COO]^-$, hentriacontanoate $[CH_3-(CH_2)_{29}-COO]^-$, dotriacontanoate $[CH_3-(CH_2)_{30}-COO]^-$, palmitoleate $[CH_3-(CH_2)_5-CH=CH-(CH_2)_7-COO]^-$, oleate $[CH_3(CH_2)_7CH=CH(CH_2)_7COO]^-$, linoleate $[CH_3-(CH_2)_4-(CH=CHCH_2)_2-(CH_2)_6-COO]^-$, linolenate $[CH_3-CH_2-(CH=CHCH_2)_3-(CH_2)_6-COO]^-$, arachidonate $[CH_3-(CH_2)_4-(CH=CHCH_2)_4-(CH_2)_2-COO]^-$, anions derived from substituted aliphatic carboxylic acids, such as, for example, neopentanoate or pivalate

[(CH$_3$)$_3$C—COO]$^-$, neononanoate [(CH$_3$)$_3$C—(CH$_2$)$_4$—COO]$^-$, or else the following C$_{10}$ structural isomers, taken alone or as a mixture (neodecanoate): 7,7-dimethyl octanoate [(CH$_3$)$_3$C—(CH$_2$)$_5$—COO]$^-$, 2,2-dimethyl octanoate [CH$_3$—(CH$_2$)$_5$—C(CH$_3$)$_2$—COO]$^-$, 2,2,3,5-tetramethyl hexanoate [(CH$_3$)$_2$CH—CH$_2$—CH(CH$_3$)—C(CH$_3$)$_2$—COO]$^-$, 2,5-dimethyl-2-ethyl hexanoate [(CH$_3$)$_2$CH—(CH$_2$)$_2$—C(CH$_3$)(C$_2$H$_5$)—COO]$^-$, 2,2-diethyl hexanoate [CH$_3$—(CH$_2$)$_3$—C(C$_2$H$_5$)$_2$—COO]$^-$, 2,4-dimethyl-2-isopropyl pentanoate [(CH$_3$)$_2$CH—CH$_2$—C(CH$_3$)(i-propyl)-COO]$^-$, the corresponding carboxylate anions of Versatic™ acid 10 (sold by the company Momentive) of empirical formula [C$_{10}$H$_{19}$O$_2$]$^-$ and of linear formula [(R$_1$)(R$_2$)C(CH$_3$)—COO]$^-$ with the symbols R$_1$ and R$_2$ being alkyls, anions derived from aromatic carboxylic acids, such as anions of benzoate, phenyl acetate, phenyl propionate or phenyl butyrate type, anions derived from carboxylic acids comprising an unsaturation, such as the acrylate anion or the methacrylate anion, and naphthenate anions.

C$_{10}$ to C$_{20}$ naphthenate anions are the corresponding anions of naphthenic acids. Naphthenic acids are by-products of the extraction of bitumen oil sands and are found mainly in bitumen oil sand residues. Commercial mixtures of naphthenic acids are used as solvents, detergents and rubber recovering agents. They may be mixtures of monocyclic and/or bicyclic carboxylic acids.

According to one embodiment of the process, it is preferable for the ligands not to have too high a molecular weight. Consequently, according to one preferential embodiment, the carboxylate ligands have from 1 to 20 carbon atoms, and even more preferentially from 1 to 12 carbon atoms.

According to one particularly advantageous embodiment, the catalyst C is a carboxylate of chromium in the oxidation state (III), chosen from the group consisting of chromium (III) acrylate, chromium(III) methacrylate, chromium(III) acetate, chromium(III) 2-ethylhexanoate, chromium(III) neodecanoate and mixtures thereof.

According to another embodiment of the process according to the invention, the chromium(III) carboxylate can be generated in situ.

According to one embodiment, the concentration of catalyst C, expressed as mol % relative to the epoxy groups of the organopolysiloxane B, is between 0.05% and 1%, preferably between 0.05% and 0.5%, more preferentially between 0.05% and 0.3% and even more preferentially between 0.05% and 0.25%.

Another advantage of the process according to the invention is that it is possible to use a small amount of catalyst.

According to one preferred embodiment of the invention, in step a), the solvent S is chosen from the group consisting of methyl isobutyl ketone, methyl ethyl ketone, toluene, xylene, chlorobenzene and mixtures thereof.

Preferably, in the process according to the invention, there is no solvent other than the solvent S chosen from the group consisting of methyl isobutyl ketone, methyl ethyl ketone, toluene, xylene, chlorobenzene and mixtures thereof.

More preferentially, the solvent S is methyl isobutyl ketone.

Even more preferentially, in the process according to the invention, there is no solvent other than methyl isobutyl ketone.

According to one embodiment of the process according to the invention, the content of solvent S used in step a) of the process as described above is between 4.5% and 20% by weight, preferably between 4.5% and 15% by weight, more preferentially between 5% and 15% by weight, and even more preferentially between 5% and 13% by weight, relative to the total weight of the reaction mixture used in step a) of the process.

If the amount of solvent S is less than 4.5% by weight relative to the total weight of the reaction medium used in step a) of the process according to the invention, the reaction medium of step a) is heterogeneous, which complicates its industrial use since risks of fouling and blocking of industrial pipes occur.

If the amount of solvent S is greater than 20% by weight relative to the total weight of the reaction medium used in step a) of the process according to the invention, the reaction time required to achieve a degree of conversion of the epoxy groups of greater than 98% could increase.

According to one preferential embodiment of the invention, in step a), the catalyst C, the inhibitor of (meth)acrylic acid polymerization, the solvent S and a part or all of the (meth)acrylic acid can be premixed before the addition of the organopolysiloxane B.

In the process according to the invention, in step a), an inhibitor of (meth)acrylic acid polymerization is introduced. Inhibitors of (meth)acrylic acid polymerization are widely known and, by way of example, mention may be made of phenolic compounds such as 4-methoxyphenol, hydroquinone and methyl hydroquinone, or alkyl diphenyl amines such as, for example, phenothiazine. Preferably, methyl ether of hydroquinone (MEHQ) or 4-methoxyphenol is used as inhibitor of (meth)acrylic acid polymerization. According to one preferential embodiment, the amount of polymerization inhibitor used is between 0.01% and 1% by weight relative to the organopolysiloxane B and even more preferentially between 0.01% and 0.5%.

In step b) of the process according to the invention, the reaction medium obtained at the end of step a) is devolatilized. For this, the reaction medium resulting from step a) is heated at a temperature of between 80 and 130° C. under reduced pressure. This devolatilization step makes it possible to evaporate off the solvent S and the excess (meth) acrylic acid.

The solvent S used in the process according to the invention can be recycled.

According to another embodiment, a filtration step can also be carried out before or after step b). Preferably, if a filtration step is added to the process according to the invention, it takes place after step b).

According to another embodiment of the invention, the process according to the invention consists of the following steps:

a) at least one organopolysiloxane B comprising at least one epoxy group is reacted, at a temperature of between 50 and 130° C., preferably between 70 and 130° C. and even more preferentially between 90 and 125° C., with acrylic acid or methacrylic acid or a mixture of the two, in the absence of alcohol and in the presence:
of a catalyst C which is a complex of chromium in the oxidation state (III),
of at least 4.5% by weight, relative to the total weight of the reaction medium of this step a), of a solvent S and
of at least one inhibitor of polymerization of acrylic acid or of methacrylic acid, b) the reaction medium obtained at the end of step a) is devolatilized, c) optionally, the reaction medium obtained at the end of step b) is filtered, and d) said composition X comprising at least one organopolysiloxane A is obtained.

During the implementation of the process, it is possible but not necessary to carry out steps a) and b) under an inert atmosphere. According to one preferred embodiment, when a phenolic compound is used as (meth)acrylic acid inhibitor, steps a) and b) of the process will be carried out under air and even more preferentially under flushing with dry air.

Another subject of the invention relates to the composition X which can be obtained by means of the process described above.

A final subject of the invention relates to a process for producing a coating on a substrate, comprising the following steps:

a) a composition X is prepared according to the process as described above, b) a radically crosslinkable silicone composition W is prepared, comprising:
  i. said composition X,
  ii. a photoinitiator, and
  iii. optionally at least one additive, c) said composition W is applied to a substrate, and d) said composition W is crosslinked by exposure to radiation.

Preferably, the substrate is a flexible textile, paper, polyvinyl chloride, polyester, polypropylene, polyamide, polyethylene, polyethylene terephthalate, polyurethane or nonwoven glass fiber support.

According to one preferred embodiment of the invention, in step d), the radiation is ultraviolet light with a wavelength of less than 400 nanometers.

The irradiation time can be short and it is generally less than 1 second and is of the order of a few hundredths of a second for small coating thicknesses. The crosslinking obtained is excellent even in the absence of any heating.

According to another embodiment, the crosslinking step d) is carried out at a temperature of between 40 and 100° C.

Of course, the curing time can in particular be adjusted, by means of the number of UV lamps used, the UV exposure time and the distance between the composition and the UV lamp.

The amount of composition W deposited on the substrate is variable and usually ranges between 0.1 and 5 g/m$^2$ of surface area treated. This amount depends on the nature of the support and on the desired non-stick properties. It is usually between 0.5 and 1.5 g/m$^2$.

This process is particularly suitable for preparing a non-stick silicone coating on a substrate which is a flexible textile, paper, polyvinyl chloride, polyester, polypropylene, polyamide, polyethylene, polyethylene terephthalate, polyurethane or nonwoven glass fiber support.

These coatings are particularly suitable for use in the non-stick field.

For polymerizing organopolysiloxanes functionalized with (meth)acrylate groups, those skilled in the art will be able to choose a suitable radical photoinitiator which absorbs light radiation with a wavelength of less than 400 nm. As an example of radical photoinitiators, mention may be made of: α-hydroxy ketones, benzoin ethers and aromatic a-amino ketones. By way of examples of a radical photoinitiator, mention will in particular be made of the following products: isopropylthioxanthone; benzophenone; camphorquinone; 9-xanthenone; anthraquinone; 1,4-dihydroxyanthraquinone; 2-methylanthraquinone; 2,2'-bis(3-hydroxy-1,4-naphthoquinone); 2,6-dihydroxyanthraquinone; 1-hydroxycyclohexyl phenyl ketone; 1,5-dihydroxyanthraquinone; 1,3-diphenyl-1,3-propanedione; 5,7-dihydroxyflavone; dibenzoyl peroxide; 2-benzoylbenzoic acid; 2-hydroxy-2-methylpropiophenone; 2-phenylacetophenone; 2,4,6-trimethylbenzoyldiphenylphosphine oxide; anthrone; bis(2,6-dimethylbenzoyl)-2,4,4-trimethylpentylphosphine oxide; 4,4'-dimethoxybenzoin; phenanthrenequinone; 2-ethylanthraquinone; 2-methylanthraquinone; 1,8-dihydroxyanthraquinone; dibenzoyl peroxide; 2,2-dimethoxy-2-phenylacetophenone; benzoin; 2-hydroxy-2-methylpropiophenone; benzaldehyde; 4-(2-hydroxyethoxy)phenyl(2-hydroxy-2-methylpropyl) ketone; benzoylacetone; ethyl (2,4,6-trimethylbenzoyl)phenylphosphinate; and mixtures thereof.

By way of examples of commercial products of radical photoinitiators, mention may be made of the products sold by the company Ciba-Geigy: Irgacure® 369, Irgacure® 651, Irgacure® 907, Darocure® 1173, etc.

The amount of photoinitiator in the composition W is generally between 0.001 and 5 parts by weight, usually between 0.005 and 3 parts by weight, per 100 parts by weight of the composition W.

The additives may include at least one additive for regulating the detachment force of a silicone/adhesive interface in the composition, which is chosen from:

(i) organic (meth)acrylate derivatives, and (ii) methacrylate-function(s)-comprising silicons.

Suitable in particular as organic (meth)acrylate derivatives are epoxidized (meth)acrylate, (meth)acryloglyceropolyester, (meth)acrylourethane, (meth)acrylopolyether, (meth)acrylopolyester and (meth)acryloacrylic compounds. Particularly preferred are trimethylolpropane triacrylate, tripropylene glycol diacrylate and pentaerythrityl tetraacrylate.

According to one preferred variant of the invention, the additive used is a (meth)acrylate-function(s)-comprising silicone. By way of representation of (meth)acrylate functions borne by the silicone and most particularly suitable for the invention, mention may more particularly be made of derivatives of acrylates, methacrylates, (meth)acrylate ethers and meth(acrylate) esters bonded to the polysiloxane chain by an Si—C bond. Such acrylate derivatives are in particular described in patents EP 281 718, FR 2 632 960 and EP 940 458.

Other additives, such as thiols or aromatic amines, can be added in order to accelerate the crosslinking of the composition W.

A final subject of the invention relates to a substrate comprising at least one coating which can be obtained according to the process as described above.

The present invention is illustrated below by nonlimiting examples.

EXAMPLES

1-Preparation of the Compositions Comprising Organopolysiloxanes Comprising Acrylate Groups The following are charged, with stirring, to a 250 ml reactor equipped with magnetic-bar stirring, a reflux condenser, an air inlet and a thermometric sheath:

130 g of a polydimethylsiloxane oil H functionalized with epoxy groups with a dynamic viscosity at 25° C. of approximately 60 mPa·s. This oil contains hydrocarbon-based groups Y comprising an epoxy group of formula (R-4) below:

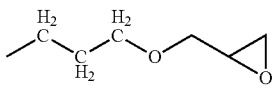 (R-4)

The molar content of epoxy in the oil H is 232 mmol per 100 g, which corresponds to an amount of epoxy groups per molecule of between 2 and 15;
25 g of acrylic acid,
0.086 g of chromium(III) acetate,
0.039 g of methyl ether of hydroquinone (MEHQ), and variable amounts of solvent (see table 1).

The stirring is adjusted to 700 rpm, then the reactor is heated at 115° C. with an aluminum hotplate while an air flow of approximately 130 ml/h is maintained. Samples are taken over time in order to measure the degree of conversion (or of transformation) of the epoxy groups by potentiometry. After 3 h 30 of reaction, the mixture is devolatilized under vacuum (gradually up to 1 mbar) while at the same time maintaining bubbling of air in order to evaporate off the acrylic acid which has not been consumed and the reaction solvents. After cooling, the composition obtained is filtered under pressure on a cellulose filter. The acrylate functions are quantitatively determined by $^1$H NMR.

The acrylation yield is calculated as the ratio between the number of moles of acrylate quantitatively determined in the composition and the number of moles of epoxy initially introduced, multiplied by 100.

The acrylation selectivity is equal to the acrylation yield over the degree of conversion of the epoxy groups. The desired objective is to obtain the highest possible selectivity.

The results are presented in table 1 below.

| Tests | MIBK solvent (% by weight) | n-Butanol solvent (% by weight) | Reaction medium | Degree of epoxy conversion (%) | Acrylation yield (%) | Acrylation selectivity (mol %) |
|---|---|---|---|---|---|---|
| Comparative 1 | 4.6 | 5.7 | Homogeneous & clear | 98.5 | 93 | 94.4 |
| Comparative 2 | 0 | 0 | Heterogeneous and cloudy | 99 | 96.5 | 97.5 |
| Comparative 3 | 2 | 0 | Heterogeneous and cloudy | nd | nd | nd |
| Comparative 4 | 4 | 0 | Slightly heterogeneous and cloudy | 99.1 | 97.6 | 98.5 |
| Invention 2 | 7 | 0 | Homogeneous & clear | 98.8 | 98.4 | 99.6 |
| Invention 3 | 10 | 0 | Homogeneous & clear | 98.5 | 97.2 | 98.7 |

These tests shows that the process according to the invention makes it possible to obtain a good yield and a good acrylation selectivity with a homogeneous and clear reaction medium in step a) of the process. The composition obtained after devolatilization is also homogeneous and does not have any unpleasant odor.

For comparative test 1 in the presence of two solvents (MIBK and n-butanol), the reaction medium is homogeneous and clear, but the acrylation selectivity is less than 95% and the acrylation yield is only 93%. Furthermore, the composition obtained has an unpleasant odor.

For comparative tests 2, 3 and 4, the reaction medium is cloudy and heterogeneous, which is not desirable for an industrial implementation.

TABLE 2

| Tests | MIBK solvent (% by weight) | n-Butanol solvent (% by weight) | Viscosity mPa·s$^{-1}$ | Mw g/mol |
|---|---|---|---|---|
| Comparative 1 | 4.6 | 5.7 | 570 | 3790 |
| Comparative 2 | 0 | 0 | 673 | 4500 |
| Comparative 3 | 2 | 0 | nd | nd |
| Comparative 4 | 4 | 0 | 675 | 4500 |
| Invention 2 | 7 | 0 | 656 | 4350 |
| Invention 3 | 10 | 0 | 648 | 4170 |

In order to characterize the compositions obtained during each test, weight-average molecular weight (Mw) was measured by a GPC analysis. It is noted that the compositions obtained during comparative tests 2 and 4 have the highest viscosity and average molecular weight, which may be an indicator of a greater presence of traces of coupling products resulting from the side reaction between an epoxy group and the hydroxyl function of the hydroxyacrylate.

The tests according to the invention make it possible to obtain the desired compromise, that is to say a process in which the reaction medium is homogeneous and clear, which makes it possible to obtain very good acrylation yields and selectivities while at the same time controlling the coupling side reactions.

2-Tests for Preparation of a Non-Stick Coating on a Flexible Support 30 g of the compositions comprising acrylate-function-comprising polyorganosiloxanes obtained according to the tests above (see tables 1 and 2) and 2 g of a radical photoinitiator which is ethyl (2,4,6-trimethylbenzoyl)phenylphosphinate are added to 70 g of a polydimethylsiloxane oil with acrylate units, sold under the trade name Silcolease® UV Poly 110 (viscosity 880 mPA·s and 5.7% by weight of acrylate group).

Each of these formulations is coated onto an LDPE GLD2 film from the company Granger, with an amount of deposit of between 0.9 and 1.1 g/m$^2$. The samples of coated film are crosslinked with a UV lamp which has a power of 100 W/cm. The traveling speed of the coated samples under the UV lamp is 200 m/min.

The quality of the polymerization and the attachment of the coating were evaluated by means of various trade tests.

The "Rub-Off" measurement used to verify the adhesion to the support and the abrasion resistance of the silicone layer consists in rubbing the index finger on the siliconized support in order to apply mechanical stresses to the layer.

The number of back and forward movements with the finger until the appearance of the rub-off (or scrubbing) phenomenon, corresponding to the silicone coating being torn into shreds, is scored. The score of 1 indicates poor abrasion resistance of the silicone layer and the score of 10 indicates excellent abrasion resistance of the silicone layer. This application test is scored from 1, the poorest, to 10, the best result.

The samples according to the invention have excellent attachment performances which are much better than comparative 1.

We claim:

1. A process for preparing a composition X comprising at least one organopolysiloxane A comprising at least one (meth)acrylate group, the process comprising:
    a) at least one organopolysiloxane B comprising at least one epoxy group is reacted, at a temperature of between 50 and 130 °C., with acrylic acid or methacrylic acid or a mixture of the two, in the absence of alcohol and in the presence:
        of a catalyst C which is a complex of chromium in the oxidation state (III),
        of at least 4.5% by weight, relative to the total weight of the reaction medium of this step a), of a solvent S, and
        of an inhibitor of polymerization of acrylic acid or of methacrylic acid,
    b) the reaction medium obtained at the end of step a) is devolatilized, and
    c) the composition X comprising at least one organopolysiloxane A is obtained.

2. The process as claimed in claim 1, wherein the molar ratio between the acrylic acid and the epoxy group(s) borne by the organopolysiloxane B is greater than 1.

3. The process as claimed in claim 1, wherein the content of solvent S used is between 4.5% and 20% by weight relative to the total weight of the reaction medium used in step a) of the process.

4. The process as claimed in claim 1, wherein the catalyst C is a complex of chromium in the oxidation state (III), of formula (1) below $$[Cr(L^1)_3] \qquad (1)$$

wherein the symbols $L^1$, which may be identical or different, represent a carboxylate anion.

5. The process as claimed in claim 4, wherein the catalyst C is a carboxylate of chromium in the oxidation state (III), chosen from the group consisting of chromium(III) acrylate, chromium(III) methacrylate, chromium(III) acetate, chromium(III) 2-ethylhexanoate, chromium(III) neodecanoate and mixtures thereof.

6. The process as claimed in claim 1, wherein the organopolysiloxane B comprises siloxyl units (I.1) and (I.2), of formulae below:

and

wherein:
a=1 or 2, b=0, 1 or 2, and a+b=1, 2 or 3,
c=0, 1,2 or 3, the symbols Y, which may be identical or different, represent a hydrocarbon-based group comprising an epoxy group;

the symbols $Z^1$ and $Z^2$, which may be identical or different, represent a monovalent hydrocarbon-based group having from 1 to 30 carbon atoms; and wherein the organopolysiloxane B comprises, per molecule, at least two silicon atoms and at least one siloxyl unit (I.1).

7. The process as claimed in claim 6, wherein, for the siloxyl unit (I.1), the symbol Y is chosen from the group consisting of the hydrocarbon-based groups (R-1) to (R-6) of formulae below:

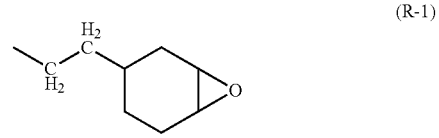
(R-1)

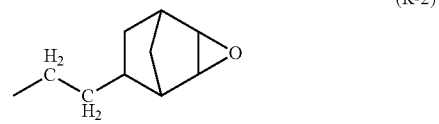
(R-2)

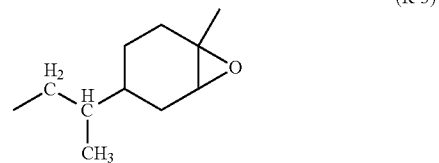
(R-3)

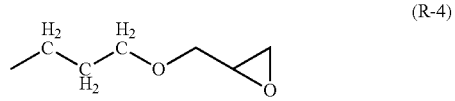
(R-4)

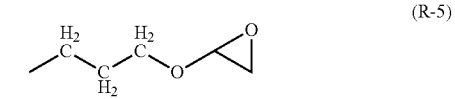
(R-5)

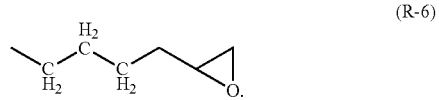
(R-6)

8. The process as claimed in claim 1, wherein the organopolysiloxane B contains from 1% to 60% by weight of hydrocarbon-based groups Y comprising an epoxy group.

9. The process as claimed in claim 1, wherein the solvent S is chosen from the group consisting of methyl isobutyl ketone, methyl ethyl ketone, toluene, xylene, chlorobenzene, and mixtures thereof.

10. The process as claimed in claim 1, wherein the solvent S is methyl isobutyl ketone.

11. A composition X obtained by the process as claimed in claim 1.

12. A process for producing a coating on a substrate, comprising the following:
    a) a composition X is prepared according to the process of claim 1,
    b) a radically crosslinkable silicone composition W is prepared, comprising:
        i. said composition X, and
        ii. a photoinitiator,
    c) said composition W is applied to a substrate, and d) said composition W is crosslinked by exposure to radiation.

13. The process as claimed in claim 12, wherein the radiation is ultraviolet light.

14. The process as claimed in claim 12, wherein the crosslinking d) is carried out at a temperature of between 40 and 100° C.

15. The process as claimed in claim 12, wherein the substrate is made of textile, paper, polyvinyl chloride, polyester, polypropylene, polyamide, polyethylene, polyethylene terephthalate, polyurethane or nonwoven glass fibers.

16. A substrate comprising at least one coating obtained according to the process as claimed in claim 12.

\* \* \* \* \*